Aug. 4, 1931.  T. G. McGIRR  1,817,262
HOLDER
Filed May 24, 1928
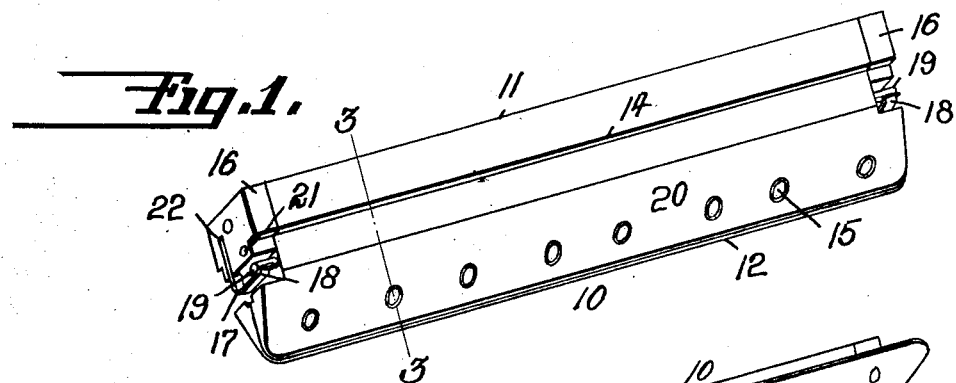
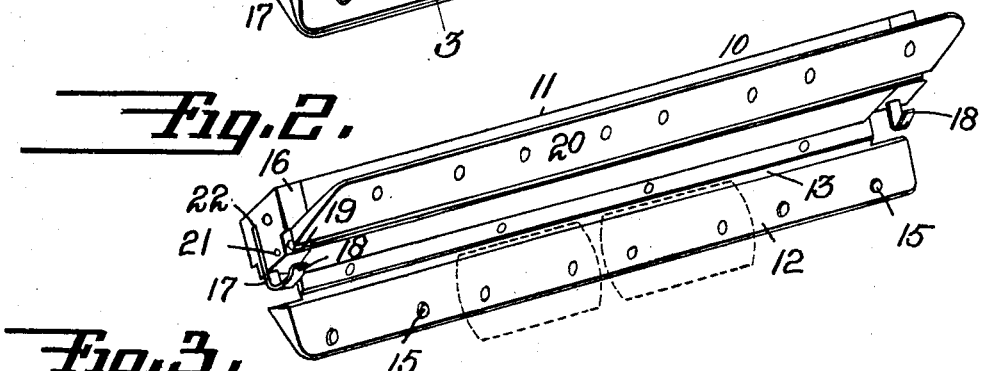
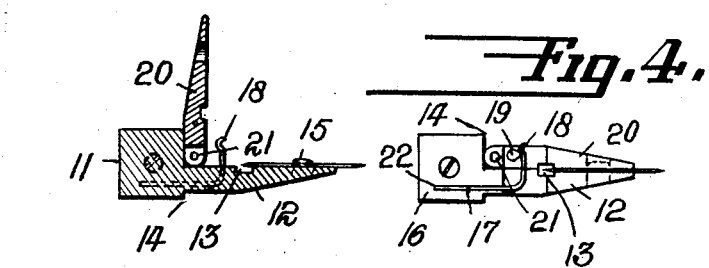
Inventor
THEODORE G. McGIRR.
By his Attorney Patented Aug. 4, 1931

1,817,262

UNITED STATES PATENT OFFICE

THEODORE G. McGIRR, OF BROOKLYN, NEW YORK

HOLDER

Application filed May 24, 1928. Serial No. 280,157.

My invention relates to holders or clamps between which pieces of flat steel may be held secure while undergoing the sharpening, honing of one or both edges, as well as the stropping of the same.

One object of my invention is to hold the pieces of flat steel which have been cut to the desired size, each may have a plurality of openings or holes for centering the same within the gripping faces of the holder; there may be any desired number of pieces provided for in the holder, but for convenience of handling and manipulating the same through the machine that they are intended to be operated upon, it is preferred to have such holders provided to retain only a few pieces each.

Another object is to provide a simple, cheap, but efficient holder that will hold these steel pieces firmly gripped between jaws, one of which is stationary and the other one movable. The holders are adapted to receive and hold during the several operations thereon, the pieces of steel, be they fabric cutting edges, razor blades, or other edges employed on any of various tools.

While another object of my invention is to provide a holder that will automatically lock itself in its closed position, and thus positively retain the plurality of steel pieces placed therein, where they will be held secure till the holder is opened for renewing or turning the opposite edge for grinding as the case may require.

With these and other objects in view, my invention consists in the construction, combination and arrangement of parts, as will be hereinafter more fully described, illustrated in the accompanying drawings, and pointed out in the claims herein appended. The invention, as at present preferred, will be more clearly undertsood by reference to the drawings which illustrates merely an example of means for putting my improvement into practice, and wherein:

Fig. 1 is a perspective of my detached holder without the pieces of steel, the jaws of the same being in a closed position; Fig. 2 is a like view of the holder with the jaws of the same shown in an open position, with one or more blades therein (the latter shown in dotted lines); Fig. 3 is a cross sectional view of the holder showing the jaws spread apart, and a blade therein, and Fig. 4 is an end view of the holder, showing a blade in position between the jaws, and the movable jaw locking the blade in position.

It may be noted that my improved holder is adapted to receive and hold a plurality of pieces of flat steel that is to be sharpened for use in such tools wherein detachable cutting edges are clamped. After which, said holders may be introduced to separate machines for further action thereon, or may be introduced for progressive grinding operations.

My present invention is an improvement on the holder shown and described in an application filed by me on March 7th, 1927, serially numbered 173,580.

It will be understood that they are by no means limited to the holding of any particular kind of blade, nor is it limited to blades requiring only one edge, and it will be further noted that the holder is adapted to handle pieces of steel wherein each edge is ground or sharpened and to protect said edge while the other edge is undergoing operation. For convenience of illustration only, I have shown the holder applied to handle safety razor blades of a well known type, but the holder may be adapted to accommodate any of the many well known blades for safety razors now on the market, as well as for tools and other devices requiring detachable blades.

Of course, it will be understood that my holder is to be used to house in locked position a plurality of pieces of flat steel, and hold them firmly between the gripping jaws until released. These holders are adapted to be fed automatically to a feeding device, the description and illustration forms a separate application filed by me on May 24th, 1928, serially numbered 280,158, which device selected the lowest holder in the chute one after the other and passes them to a machine where they are to be further acted upon by a coarse grinder first, then a fine one, then honed and lastly stropping, said machine may be all combined, or may be composed of separate such machines for operation on the blades one after the other, such machine forms no part of this application, suffice to say that the holders one and all after being filled with steel pieces, are placed in the automatic chute where they are selected and passed to the machine to be operated upon for its respective operation.

While I have attempted to indicate some of the uses of my invention in the preceding paragraphs, it will become apparent in the following paragraphs that other uses and advantages thereof will readily be found.

Referring to Fig. 1, it will be seen that the holder 10 comprises a rectangular body having a flat pedestal base 11, on which it is held perfectly true while passing progressively from the feeding device to and through the various grades of grinders, polishers, honing as well as stropping, or any other devices in their respective operations. The base which is rectangular in cross section has integral therewith one jaw 12, on the inner side of which is provided with a channel 13, and a shoulder 14, while on its inner gripping face it may be provided with studs, buttons or other projections 15, for the steel blanks to be placed upon.

To each end of the holder 10, I prefer to add an end piece 16, which may be provided with the locking means such as a leaf spring 17, one end of said spring is housed in the piece 16, while its other or free end is bent and has a shoulder 18, which is adapted to engage the triangular stud 19, on the movable jaw 20. The pin 21, in said piece 16, fits into an orifice in the movable member or jaw and forms a hinge for opening and closing the same, while the shoulder 18, fits over the stud 19, and holds the same in a closed or locked position.

The object of attaching a separate piece 16, on the end of the holders, allows these pieces to be machined and otherwise acted upon such as slitting the end as shown at 22, for holding the end of the locking spring therein, and at the same time assisting in making a far better job in the assembling than could be done were it simply two members hinged together. As noted, it may be arranged otherwise without departing from the spirit of the invention.

The holder may be clamped in proper position on the sharpening device while it is undergoing such operation, also may be suitably attached to the other devices, such devices and clamping means forming no part of my present invention, therefore such is not shown.

With my improved holder for clamping securely razor or other cutting blades or tools, as has been noted, it is not only possible to provide a simple and reliable holder, but permitting the same to be so adjusted to the various devices whereby they would not only be ground and sharpened in a satisfactory manner but, at the same time, rapidly.

In accordance with the provisions of the patent statutes, I have herein described the principal form of my invention, which I now consider to represent the best embodiment thereof, but I desire to have it understood that the form of holder is only illustrative as it may be adapted for other uses than those specified herein. While the design of the holder is adapted for this particular purpose, it may be changed or altered to meet the particular requirements without interfering in any way with the general appearances or operation of the device.

Having thus indicated the ends sought by me, what I claim as new and desire to protect by Letters Patent is:

1. A holder for objects to be sharpened comprising a base member, a fixed jaw formed integral with the base and having a channel in one face, the other face of the said jaw provided with a shoulder, a pair of blocks, one removably attached to each of the ends of the base member, a second jaw pivotally connected at its ends to the respective blocks, said pivoted jaw having a channel in one face registering with the channel in the face of the other jaw member, and a leaf spring device carried by each block and engaging a projection on the pivoted jaw when said jaw is in locking position with respect to the fixed jaw, to hold an object in position therebetween.

2. A holder for objects to be sharpened comprising a base member, a fixed jaw carried by the base and having a channel in one face and extending from end to end thereof, a pair of blocks having cross-sectional dimensions similar to the cross-sectional dimensions of the base, one removably attached to each of the ends of the base member, a second jaw pivotally connected at its ends to the respective blocks, said pivoted jaw having a channel extending from end to end in one face thereof and registering with the channel in the face of the other jaw member, and a spring device carried by each block for holding the jaws in locked position upon an object placed therebetween.

3. A holder for objects to be sharpened comprising a pair of clamping jaws, each having a channeled face, and the channels registering when the jaws are in closed position to provide an opening for receiving the sharpened edge of an object when placed therebetween, a base member to which one of the jaws is rigidly attached, a pair of blocks removably attached to the respective ends of the base, the other jaw pivotally attached at its ends to the respective blocks, and means carried by the blocks for holding the jaws in locked position.

4. A holder for objects to be sharpened comprising a pair of clamping jaws, each having a channeled face, and the channels extending from end to end of the jaws and registering when the jaws are in closed position to form an opening between the jaws to receive the sharpened edge of an object held therebetween, a base member to which one jaw is rigidly attached, said jaw having a shoulder on its remaining face, a pair of blocks, one removably attached to each of the ends of the base, the other jaw pivotally attached at its ends to the blocks, and each block carrying a spring member bent to extend transversely of the jaws and having a cam formed thereon at its end to engage a projection on the pivoted jaw to hold the jaws in locked position.

5. A holder for objects to be sharpened comprising a pair of jaws, one jaw provided with a shoulder, each of said jaws having a channeled face, and the channels registering when the jaws are in closed position to form an opening therebetween, a pair of blocks, one removably attached to each of the ends of the base, the other jaw pivotally attached at its ends to the respective blocks, a spring clip carried by each block, said clip being bent to extend transversely of the jaws and having a cam formed thereon at its end to engage a projection on the pivoted jaw to hold the jaws in locked position, and the ends of the jaws being cut away to receive the spring clip.

In testimony whereof I affix my signature.

THEODORE G. McGIRR.